United States Patent

[11] 3,587,909

| [72] | Inventor | Patrick W. Connolly<br>Detroit, Mich. |
|---|---|---|
| [21] | Appl. No. | 792,583 |
| [22] | Filed | Jan. 21, 1969 |
| [45] | Patented | June 28, 1971 |
| [73] | Assignee | Visi-Trol Engineering Company<br>Detroit, Mich. |

[54] STUD FEEDING APPARATUS
8 Claims, 8 Drawing Figs.

| [52] | U.S. Cl. | 221/93 |
|---|---|---|
| [51] | Int. Cl. | B65h 3/44,<br>G07f 11/00 |

[50] Field of Search.............................................. 221/93,
238, 299, 94

[56] References Cited
UNITED STATES PATENTS

| 607,939 | 7/1898 | Mayo | 221/93 |
|---|---|---|---|
| 3,068,626 | 12/1962 | Ianuzzi et al. | 221/93 |
| 3,297,199 | 1/1967 | Law | 221/93 |

*Primary Examiner*—Raphael H. Schwartz
*Attorney*—Hauke, Gifford and Patalidis

ABSTRACT: Apparatus and method for feeding a group of preoriented studs or similarly shaped articles from a common source to separated delivery stations.

PATENTED JUN28 1971 3,587,909

INVENTOR
PATRICK W. CONNOLLY
BY
ATTORNEYS

3,587,909

1
STUD FEEDING APPARATUS

BACKGROUND OF THE INVENTION

This invention relates to means for feeding preoriented studs or similar articles from a source to a delivery station, and more particularly to a method and apparatus for feeding preoriented studs, a group at a time, from a common source to separated delivery stations.

There are many assembly processes in which it is desirable to simultaneously mount a group of studs on a workpiece. Usually each stud is mounted in position by a tool which receives it in a preoriented attitude. It is common practice to preorient the studs in a vibratory hopper or the like which introduces them in a series into a track. The track guides them toward a dispensing apparatus which removes the studs, one at a time, from the series and transfers each individual study to its delivery station. The problem is that such conventional dispensing apparatus is very complex where several tools are supplied from a common feed track. Furthermore the individual distribution of studs from a single source to several tools limits the frequency any single tool can be fed in a given period of time.

SUMMARY OF THE INVENTION

The broad purpose of the present invention is to provide a method for delivering preoriented studs from a single source to a plurality of delivery points as a group rather than individually, and apparatus for practicing the preferred method. In the preferred embodiment, the studs are preoriented and introduced into a feed track in the usual manner. A gate device mounted at the outlet of the track receives the studs into a group of dispensing positions in which their heads abut one another, and their shanks depend downwardly. When all of the dispensing positions are filled, the gate is opened to drop the studs as a group into a separator.

The separator has a group of openings, one associated with each study in the gate device. The separator openings are formed with their inlets aligned with the stud shanks. This allows the separator to be positioned so that each shank is partially received in its opening prior to being released. The outlets of the openings are staggered on opposite sides of and below their inlets so that when the studs are released, each pair of contacting studs are guided toward opposite lateral directions and separated as they pass through the separator.

The special configuration of the separator openings allows a group of studs to be simultaneously separated from one another, and each separated stud to be passed in its preoriented state toward its delivery station. In addition, even though the group of openings are capable of receiving a group of studs that are contacting one another, the separator is formed with a wall between each pair of adjacent openings.

Still further advantages of the invention will become readily apparent to those skilled in the art to which this invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
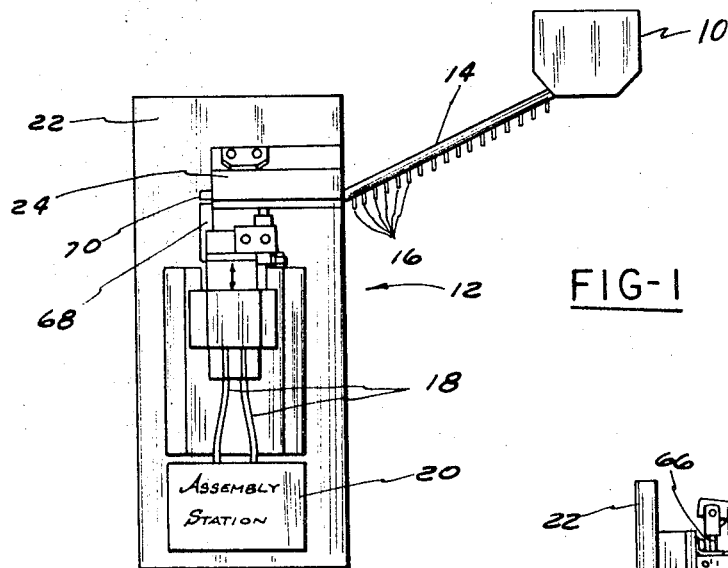
FIG. 1 is a view showing a stud feed apparatus, illustrating the preferred embodiment of the invention, connected to the output of a vibratory hopper in which the studs are preoriented.

Referring to the drawings, the apparatus for practicing the preferred method is illustrated in FIG. 1 as comprising a vibratory hopper 10 connected to a feed apparatus 12 by an inclined track 14. Studs 16 or other similarly shaped articles, each having a head and a depending shank are supplied to the hopper 10 which preorients and then introduces them into the track 14. The track 14 supports the heads of the studs with their shanks depending downwardly, and guides them in a continuous series toward the feed apparatus 12.

The studs 16 are received from the outlet of the track 14 by the feed apparatus 12 in groups of 5, and then separated from one another as they are dispensed as a group into five flexible discharge conduits 18 for delivery toward an assembly station 20. The particular nature of the tools which receive the studs in the assembly station 20 is not of particular importance for practicing the invention other than to indicate that each stud is delivered in a preoriented attitude to its respective delivery station. Furthermore it is to be understood that although the studs are illustrated in the preferred embodiment as being delivered in groups of five, the method can be practiced with groups of any suitable number.

Figure 2:
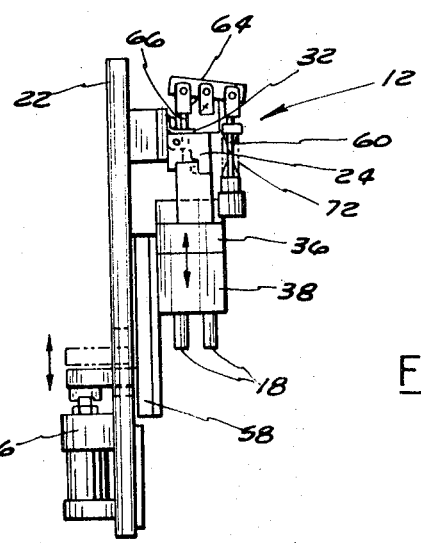
FIG. 2 is an elevational view of the preferred feed apparatus as seen from the left side of FIG. 1.
Figure 3:
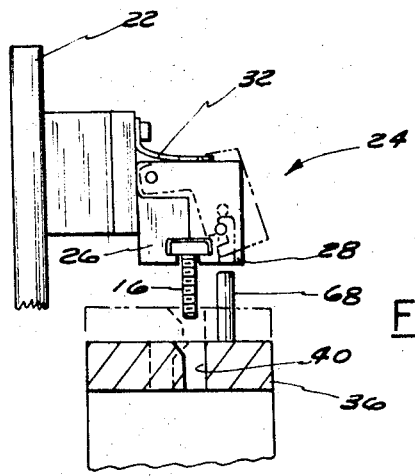
FIG. 3 is a fragmentary view of the gate device shown in its open and closed positions.

Now referring to FIGS. 2 and 3, the feed apparatus 12 comprises a frame 22, and a gate device, generally indicated at 24, that is mounted at the outlet of the track 14. The gate device comprises a rail 26 that is fixedly mounted on the frame 22 and a rail 28 that is pivotally movable toward a closed position in which the two rails form a channel for receiving a group 30 of five studs in dispensing positions in which they are supported by their heads with their shanks depending downward between the rails, and toward an open position to release the group of studs from their dispensing positions. A spring 32 biases the rail 28 toward its closed position.

Figure 6:
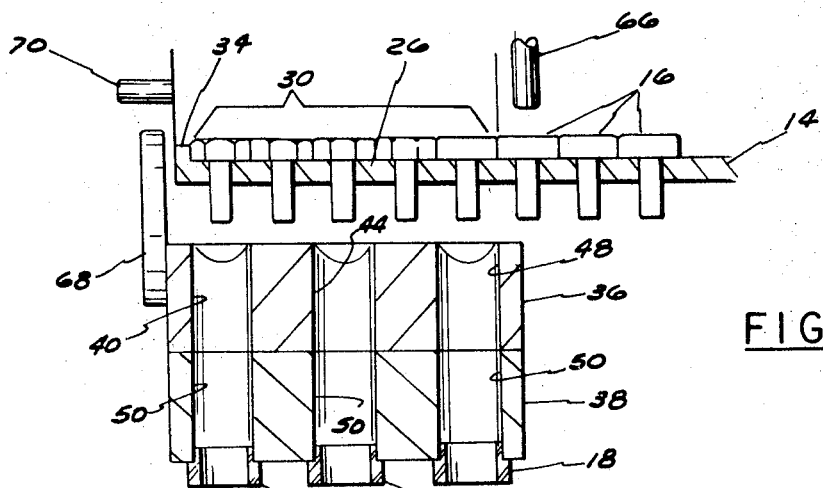
FIG. 6 is a schematic view showing the studs being fed into the gate device.

As can best be seen in FIG. 6, the studs are advanced from the track 14 into the gate device 24 until the lead stud abuts a stop 68. As the gate device 24 is filled, the head of each stud in the group abuts the heads of other studs, and the shank of each stud is parallel to the shanks of the remainder of the group. Preferably, the portion of the track 14 leading into the gate device defines a linear path of motion to avoid any tendency of the studs to become jammed as occurs in a curved track.

Figure 5:
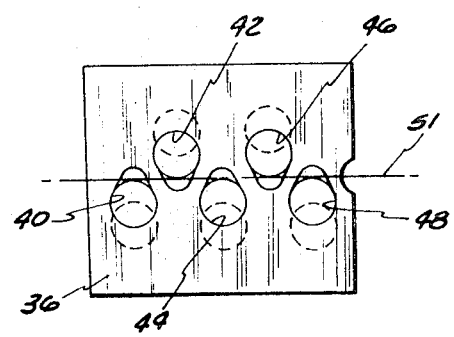
FIG. 5 is a plan view of the separator.

As best shown in FIGS. 3, 5 and 6, a separator 36 and a manifold 38, are mounted on frame 22 below the gate device 24. The separator has five openings 40—48, each having an outlet aligned with a respective opening 50 in the manifold. The five openings 50 are each connected to a discharge conduit 18. Referring to FIG. 6, the dispensing positions of the group 30 of studs are disposed to fall from the gate in a vertical plane generally indicated at 51. The inlet of each of the openings 40—48 has an elongated inlet with a narrowed side that overlaps the plane 51 so as to be aligned with the shank of its associated stud in the gate device. This narrow side of the inlet has a diameter greater than the shank but less than the head of each stud. The opposite side of each inlet is enlarged and spaced from the plane 51. The outlets of the separator openings are staggered on opposite sides of the plane 51 with the outlets of openings 40, 44 and 48 being formed on one side, and openings 42 and 46 being formed on the other side.

Each of the openings 40–48 from the large end of its inlet to its outlet has a sufficient diameter to pass a stud that is dropped from the gate device. The laterally enlarged inlet configuration of each of the openings 48 provides a dual function. It provides a wall between adjacent openings even though the group of openings are aligned with studs that contact one another. It also separates each stud from the remainder of the group 30 by deflecting each pair of contacting studs toward opposite directions as they pass stem first into the manifold for passage to a delivery station.

Figure 4:
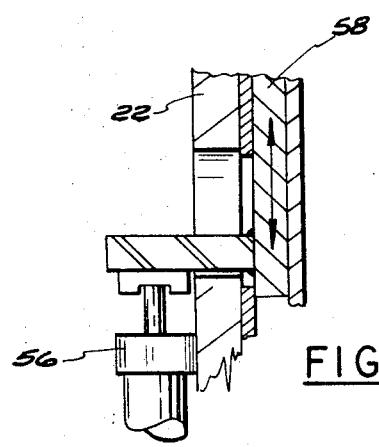
FIG. 4 is an enlarged view of the actuator for raising and lowering the separator.
Figure 7:
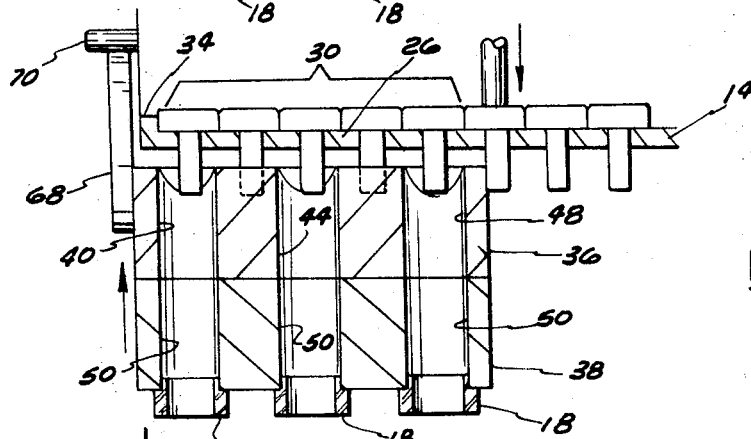
FIG. 7 is a view, similar to FIG. 6, but showing the separator raised to partially receive the stud shanks prior to their release.

Referring to FIGS. 2, 4 and 7, when the gate device 24 has been filled with a group of five studs, a fluid actuator 56 which is connected to the separator 36 by a slide device 58 raises the separator 36 toward the gate device. As the separator is raised, it pushes a rod 60, slidably mounted in a bushing 52, to pivot a lever 64 which is connected to a stop 66. The stop 66 is moved down to engage the stud 16 that is at the inlet of the gate device in order to constrain the motion of the remainder of the studs 16 in the feed track 14 until the studs in the gate have been dispensed.

Figure 8:
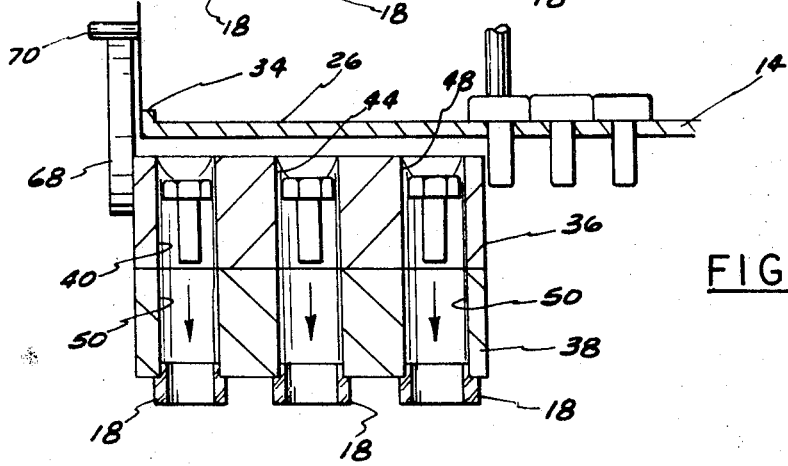
FIG. 8 is a view showing the studs being released from the gate device into the separator openings.

As the stop 66 is lowered, a lifter 68 on the separator 36 engages a pin 70 carried by the pivotal rail 28 and moves it toward its open position. As the rail 28 is opened the group 30 of studs are released from the dispensing position. At the upper end of its motion, the inlet of each of the separator openings 40—48 partially receives the lower end of its associated stud to guide it as it falls. As best shown in FIGS. 3 and 8, each pair of adjacent studs in the group 30 are deflected toward opposite lateral directions as the group passes through the separator 36 toward the manifold 38. Thus three of the studs are deflected toward one side of the plane 51 and the other two studs are deflected toward the opposite lateral side so that each stud is separated from the remainder of the group.

When the studs have been separated and passed through the manifold 38, the actuator 56 then retracts the slide device 58 to lower the separator 36 so that it does not interfere with the introduction of the next group of studs into the gate device 28, and to lower the lifter 68 to return the rail 28 to its closed position. The linkage to the stop 66 is such that when the rail 28 has been returned to its closed position, the stop 66 is raised by a spring 72 which biases the rod 60 downwardly. As the stop 66 is raised a new group of studs 16 is advanced from the track 14 into dispensing positions in the gate to repeat the feed cycle.

Obviously suitable control means can be connected to the feed apparatus so that the studs are released from the gate device in response to a suitable signal from the assembly station 20.

I claim:

1. Apparatus for separating studs or similarly shaped articles from a common source to a plurality of separated delivery stations, each stud having a head and a depending shank, said apparatus comprising:
    a. a gate device having means for receiving and supporting a group of studs in dispensing positions in which their heads abut one another and their shanks are oriented in a common direction;
    b. feed means for introducing a group of studs to said dispensing positions;
    c. means for dispensing the group of studs from their dispensing positions in the direction in which their shanks are oriented; and
    d. a separator having a group of openings, each with an inlet aligned to receive the shank of a stud being dispensed from the gate device and an outlet connected to a delivery station, adjacent inlets having a major portion of their openings on opposite sides of a plane passing through the shanks of the studs when the studs are in said dispensing positions to thereby separate the respective studs from one another as they are received through the inlets of the openings and passed toward their outlets.

2. The apparatus as defined in claim 1, in which the studs are supported in said dispensing positions with their shanks depending downwardly, and the gate device is operable to release the studs so that they fall into the separator openings.

3. The apparatus as defined in claim 1, in which the feed means comprises a track, means for introducing a series of studs into the track from a source in which the studs have been oriented in a predetermined attitude, said track being arranged to advance the studs from the source toward the gate device, and a stop member operable to stop movement of the studs along the track when the dispensing positions in the gate device are filled.

4. The apparatus as defined in claim 1, in which the separator openings are formed to guide abutting pairs of studs toward opposite lateral directions relative to the direction in which they are dispensed.

5. The apparatus as defined in claim 1, in which the separator is movable toward and away from a position in which the shank of each stud in a dispensing position is partially received by the inlet of a separator opening.

6. The apparatus as defined in claim 1, in which said plane is a vertical plane and said openings on said separator are disposed to receive the studs when the studs are dropped by said gate device 7. Apparatus for separating studs or similarly shaped articles from a common source to a plurality of separated delivery stations, each stud having a head and a depending shank, said apparatus comprising:
    a. a gate device having means for receiving and supporting a group of studs in dispensing positions in which their heads abut one another and their shanks are oriented in a common direction;
    b. feed means for introducing a group of studs to said dispensing positions;
    c. means for dispensing the group of studs from their dispensing positions in the direction in which their shanks are oriented; and
    d. a separator having a group of openings, each with an inlet aligned to receive the shank of a stud being dispensed from the gate device and an outlet connected to a delivery station, and said separator being movable toward and away from a position in which the shank of each stud in a dispensing position is partially received by the inlet of a separator opening.

8. The apparatus as defined in claim 7, wherein the separator is movable in a vertical plane.